W. R. KING.
AUTOMATIC HINGE CAR FENDER.
APPLICATION FILED SEPT. 22, 1914.

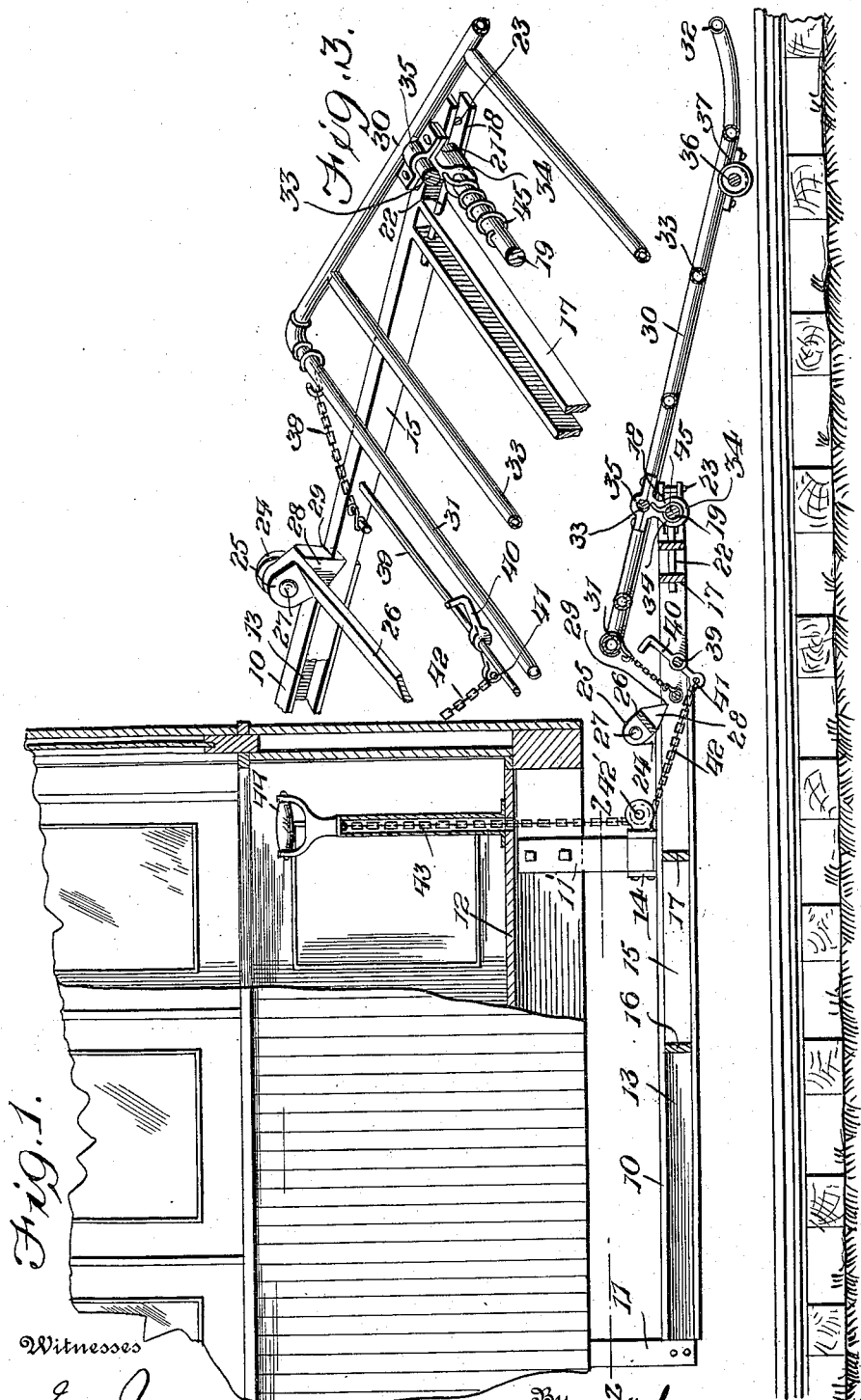

1,159,048.

Patented Nov. 2, 1915.
2 SHEETS—SHEET 2.

UNITED STATES PATENT OFFICE.

WHITCOMB R. KING, OF IPSWICH, MASSACHUSETTS.

AUTOMATIC HINGE CAR-FENDER.

1,159,048.  Specification of Letters Patent.  Patented Nov. 2, 1915.

Application filed September 22, 1914. Serial No. 862,979.

*To all whom it may concern:*

Be it known that I, WHITCOMB R. KING, citizen of the United States, residing at Ipswich, in the county of Essex and State of Massachusetts, have invented a certain new and useful Improvement in Automatic Hinge Car-Fenders, of which the following is a specification.

This invention relates to improvements in fender attachments for cars, more particularly to trolley cars and like vehicles, and has for one of its objects to improve the construction and increase the efficiency and utility of the same.

Another object of the invention is to provide a simply constructed device of this character which may be drawn beneath the car when not in use.

Another object of the invention is to provide a device of this character which is retained in inoperative position when not in use and adapted to be instantly depressed in operative position by the action of the motorman or other operative when required.

Another object of the invention is to provide a device of this character which may be adapted, without material structural change, to trolley cars or the like vehicles without material structural change in either the car or the fender apparatus.

Another object of the invention is to provide a device of this character which may be locked in its forward position to prevent its displacement in event of its coming in contact with obstructions on the track.

With these and other objects in view, the invention consists in certain novel features of construction as hereinafter shown and described and then specifically pointed out in the claims; and in the drawings illustrative of the preferred embodiment of the invention—

Figure 1 is a side elevation partly in section of the forward portion of a conventional trolley car with the improvement applied, the latter being in section longitudinally. Fig. 2 is a plan view with the suspension devices in section on the line 2—2 of Fig. 1. Fig. 3 is a view in detail illustrating portions of the construction. Fig. 4 represents perspective views of portions of the device in detail.

The improved device comprises stationary supports suspended beneath the car, a frame slidable in the supports, and a fender device mounted to swing upon the sliding frame and adapted to be depressed into operative position when required.

The stationary supports comprise members 10 spaced apart a distance slightly greater than the gage of the track and suspended by rearward straps or like rigid devices 11 from the base or floor portion of the car, and by forward straps 11' from the base or floor portion the latter being indicated conventionally at 12. The strap devices 11—11' will be varied to correspond to the frame and size of the car to which the device is attached, and practically the only change required to adapt the device to a car will be to modify the suspension devices, as will be obvious.

Each of the members 10 is formed with a longitudinally directed channel indicated at 13 in their confronting faces, the channels forming guides extending the full length of the members and open at their forward ends. The forward suspension straps 11' are preferably united to the members 10 by ears 14 between which the straps are bolted or otherwise secured, while the rearward straps 11 are bolted or otherwise secured at their lower ends to the rear ends of the members 10. The forward edges of the rear straps 11 thus project partially over the rear ends of the channels 13 and form stops thereon, as hereinafter explained.

Slidably disposed in the channels 13 of the members 10, is a carrying frame comprising side members 15 and a rear connecting member 16, the sides 15 engaging in the channels 13, as shown. The members 15 are coupled and supported by a plurality of transverse members 17 similar to the rear member 16, the forward members 17 being spaced a relatively short distance apart as shown. The side members 15 of the carrying frame are formed with forwardly opening slots, one of which is represented at 18, and engaging by its ends in these slots is a bar 19, the bar thus extending transversely of the carrying frame in advance of the forward member 17, each bar being provided with a squared portion 20, adjacent to the inner face of the members 15. Engaging over the squared portions 20 by a square aperture, is a holding device 21, having a rod 22 projecting therefrom and extending slidably through apertures in the adjacent grouped members 17. By this means, the member 19 is maintained in position relative to the carrying frame and prevented from rotating thereon. Each of the slotted terminals of the members 15 are further secured by clamp bolts indicated at 23.

Directed upwardly from the forward end of each of the stationary members 10 is an ear 24, and bearing against these ears 24 are other ears 25 connected by a member 26, the ears 24—25 being pivoted together at 27. Depending from the member 26 at the ends are V-shaped lugs 28 which engage in notches 29 in the side members 15 of the carrying frame, and thus hold the carrying frame locked in outer position, and prevent it from being moved inwardly, the object to be hereinafter explained.

The fender portion of the improved device is preferably formed of piping, such as steam or gas piping, and includes side members 30, a rear member 31, a forward member 32, and a plurality of transverse connecting members 33. Any required number of members 33 may be employed, and it is not desired to limit the device in this respect, but for the purpose of illustration four of the transverse connecting members 33 are shown. At their forward ends the sides 30 are curved upwardly as shown in Fig. 1 to increase their efficiency and action.

Mounted for rotation upon the bar 19 are bearings 34, including a cap 35 whereby one of the members 33 of the frame of the fender is rigidly supported. By this means the fender frame is mounted for rotation through the action of the bearings upon the bar 19. Preferably, the bearings 34—35 will be coupled to one of the transverse members 33 rearwardly of the center of the fender frame as shown, but may be attached to any of the members 33 as preferred. By this means the fender frame is mounted to swing upon the bar 19 and may be disposed substantially in parallel relation to the slidable frame, or obliquely to the longitudinal plane of the track as represented in full in Fig. 1, with the forward curved portion of the fender frame operating in close proximity to the track. Mounted for rotation beneath the fender frame near its forward end is a shaft 36 carrying small bearing wheels 37 which project slightly below the lower line of the fender frame, and are thus in position to engage the road bed of the track and prevent the fender frame from coming in contact with the track when depressed. By this means the fender frame is prevented from injury when running over rough roads.

Stop chains 38 are coupled between the fender frame and the side members 15 of the slidable carrying frame, to limit the downward movement of the fender frame, and prevent undue depression thereof.

Extending between the side members 15 of the slidable carrying frame is a rod 39 having a hook device 40 swinging thereon and adapted to engage the member 31 of the fender frame, and thus maintain the fender frame substantially in parallel relation to the slidable carrying frame. By this means, the fender frame may be disposed in inoperative position, and held in that position by the hook. The hook 40 extends beyond the rod 39 in position to receive a snap hook or other suitable fastening devices 41 at the lower end of the pulling chain 42. By this means it will be obvious that an upward pull of the chain 42 or a rearward movement of the fender will release the member 31 and allow the forward end of the fender frame to drop until stopped by the tightening of the chains 30. The chains 38 will be of such length that the lower curved portion of the fender frame and the wheels 37 depending below the same will not quite reach the ground under normal conditions, the object to be hereinafter explained.

Any suitable means may be employed for actuating the chain 42 from the motorman's position in the car, but for the purpose of illustration, a tubular stand 43 is supported upon the floor of the car 12 and provided with a hand grip or handle 44 at its upper end which is connected with the chain 42, the chain being lead about a pulley 42' so that by simply pulling up on the handle 44, the latch device 40 will be instantly actuated to release the fender frame. Springs 45 surround the member 19 and engage the bearings 34 at one end, and their other ends are secured in the member 19 and exert their force to automatically move the fender frame into its lower position, and to hold the same yieldable.

A plurality of guard straps 46 are preferably attached to the members 31, 32 and 33 of the fender frame.

The rearward movement of the slidable carrying frame is limited, as before stated, by the portions of the rear suspension devices 11 which extend over the rear ends of the channels 13.

While the car is moving, under normal conditions, the fender frame will be held in elevated position by the hook 40, and when the motorman observes an obstruction upon the track, a simple pull upward upon the handle 44 connected with the chain 43 will release the fender frame and permit the springs 45 to throw the latter downwardly to be checked by the stop chain 38. This movement will dispose the wheels 37 slightly above the track, as before described, but in event of the fender striking an object, the latter will be depressed and the wheels caused to contact with the track, thus preventing the object which is engaged by the fender frame from being carried beneath it. If the obstruction is a person or an animal, the curved portion of the fender will pass beneath them and carry them upon the straps 46 and prevent injury, or at least impart only slight injury.

The improved device is simple in construction, can be applied to cars of different forms and sizes without material structural change and operates effectually for the purpose described.

Having thus described the invention, what is claimed as new is:—

1. A device of the class described comprising a support adapted to be suspended beneath a car body, a carrying frame slidably engaging said support and including a transverse bar, bearings carried by said transverse bar, a fender frame including a rear transverse member and connected to said bearings, springs operating to yieldably maintain said fender frame in depressed position, a holding member mounted to swing relative to said carrying frame and engage the rear transverse member of the fender frame and hold the fender frame in elevated position against the resistance of said springs, and means under the control of the operator on the car for releasing said holding member.

2. A device of the class described comprising a support adapted to be suspended beneath a car body, a frame slidably engaging said support and including side members having open slots and transverse members spaced apart, a bar engaging by its ends in said slots and provided with squared portions, holding devices extending through the spaced transverse members of said frame and arranged slidably therein and having sockets to receive the squared portions of the bar, bearings mounted for rotation upon said bar, and a fender frame engaging said bearings and thereby swingingly supported relative to the slidable frame.

3. A device of the class described comprising a support adapted to be suspended beneath a car body, a carrying frame slidably engaging said support, bearings extending from said carrying frame, a fender frame including a transverse member rigidly engaging said bearings and rotative therewith relative to the carrying frame, a spring operating to move the fender frame into its lower position, means operating against the resistance of said spring to hold the fender frame against downward movement, and means adapted to be operated by the motorman on the car for releasing said holding means.

4. A device of the class described comprising a support adapted to be suspended beneath a car body, a frame slidably engaging said support and including side members having open slots and transverse members spaced apart, a bar engaging by its ends in said slots and provided with squared portions, holding devices extending through the spaced transverse members of said frame and arranged slidable therein and having sockets to receive the squared portions of the bar, bearings mounted for rotation upon said bar, a fender frame engaging said bearings and thereby swingingly supported relative to the slidable frame, and means for supporting said fender frame in elevated position and releasable by the rearward movement of the fender frame.

In testimony whereof I affix my signature in presence of two witnesses.

WHITCOMB R. KING. [L. S.]

Witnesses:
GEORGE A. SCHOFIELD,
AMELIA M. CLARK.

Copies of this patent may be obtained for five cents each, by addressing the "Commissioner of Patents, Washington, D. C."